Figure 1A:
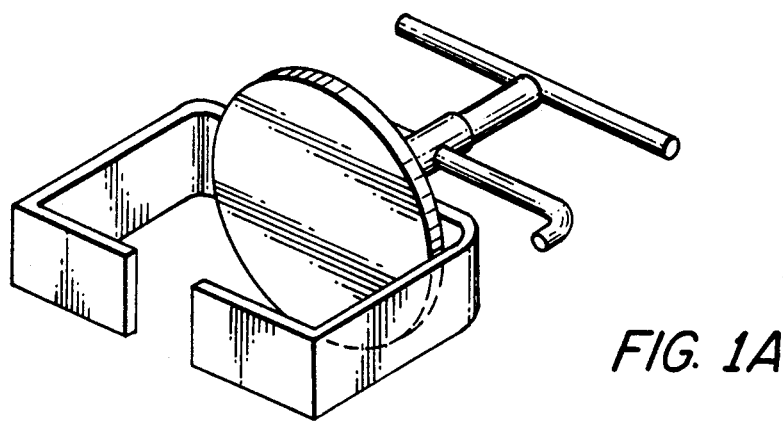

United States Patent

Keville et al.

[11] Patent Number: 5,272,968
[45] Date of Patent: Dec. 28, 1993

[54] CAN DRAINER

[76] Inventors: Patricia M. Keville, 235 17th St. SE., Washington, D.C. 20003; Thomas J. Murphy, Jr., 7207 Patton Dr., Woodbine, Md. 21797

[21] Appl. No.: 947,547

[22] Filed: Sep. 21, 1992

[51] Int. Cl.$^5$ ............................................. B30B 9/04
[52] U.S. Cl. ................................. 100/110; D7/666; D7/686; 99/495; 100/116; 100/266
[58] Field of Search ............... 100/110, 116, 265, 266; 99/495; D7/665, 666, 686, 668

[56] References Cited

U.S. PATENT DOCUMENTS

| | | | |
|---|---|---|---|
| D. 244,118 | 4/1977 | Dick | D7/686 |
| D. 311,116 | 10/1990 | Pentland | D7/666 |
| D. 330,313 | 10/1992 | Green | D7/666 |
| 1,095,449 | 5/1914 | Brooks et al. | 100/266 X |
| 1,422,196 | 7/1922 | Gray | 100/266 X |
| 1,492,908 | 5/1924 | Trumbo | 100/110 X |
| 1,950,763 | 3/1934 | Walter | 100/265 X |
| 3,120,678 | 2/1964 | Glenny | 100/266 X |
| 3,515,057 | 6/1970 | Aldridge | 100/266 X |
| 3,995,544 | 12/1976 | Farley | 100/116 |
| 4,355,574 | 10/1982 | Bond et al. | 100/110 X |
| 4,860,647 | 8/1989 | Kerslake | 100/110 X |

*Primary Examiner*—Stephen F. Gerrity

[57] ABSTRACT

A hand utensil for draining liquid from canned foods, or for removing can lids after opening and of the type having a base (20) with a grip (26) which contains a pass through hole (22) containing a spring (19) in which the T shaped handle (10) passes through when compressed causing the magnetic plate (30) to place pressure on a lid of an opened can, and when uncompressed the T shaped handle (10) will return to its original position causing the can lid to be removed from the can attached to the magnetic plate (30). The utensil is made of an inflexible material so that it is strong enough to safely provide the required pressure.

2 Claims, 2 Drawing Sheets

CAN DRAINER

BACKGROUND—FIELD OF INVENTION

This invention relates to food can drainers, and can lid removal, specifically to such drainers which are used for draining unwanted liquids from the can upon opening.

BACKGROUND—DESCRIPTION OF PRIOR ART

Canned food commonly supplied for purchase by consumers contains liquids. These liquids, while required to provide moisture for the food while it is in the can, are generally unwanted at the time the food is removed from the can for preparation and consumption.

Current methods for draining the unwanted liquids, and removing the can lid, include the following:

(a) Opening the can, removing the lid, and placing the contents in a colander to drain the liquid (an unsanitary operation since the food is exposed while draining in the colander).

(b) Opening the can, holding the now loose lid in place with fingers, and turning the can to drain (an operation both unsafe and unsanitary).

(c) For more solid canned foods (tuna, salmon, crushed pineapple and others) the can is opened, the lid retained in place by fingers and pressure applied to the can lid to force out the liquid, (again, unsanitary and unsafe) or the lid is removed and the contents placed on a paper towel in order to soak up the unwanted liquid. Again,, this is unsanitary as the food is exposed to the surrounding air and contaminants while the food is draining.

(d) Another unsanitary and unsafe process involves using ones fingers, a knife, fork or a like instrument to remove the sharp lid from the can as the lid may have become wedged in the can when compressed by ones fingers.

(e) Clothing may also be soiled or stained from the resultant liquid either squirting out of the can or coming in contact with ones fingers.

(f) Can lids of canned food containing primarily liquid, (sauces, soups, etc.) sometimes slide into the can contents after opening causing one to use fingers, fork, knife, etc. to attempt to retrieve the can lid. This again presents unsanitary and unsafe conditions.

In each of the above processes, there are unsanitary, unsafe, and time consuming actions required to drain the unwanted liquid from the can.

OBJECTS AND ADVANTAGES

Accordingly, besides the objects and advantages of the liquid drainer described in our above patent, several objects and advantages of the present invention are:

(a) to provide a food can drainer and lid removal tool which will reduce the time required in the meal preparation process.

(b) to provide a food can drainer and lid removal tool whose production allows for improved safety and less injuries due to decreased handling of sharp can lids.

(c) to provide a food can drainer and lid removal tool whose production allows for improved sanitary conditions due to less handling of the can lid, and a decreased period of time opened food is exposed to the air.

(d) to provide a food can drainer and lid removal tool which will reduce the number of injuries caused by improper use of a can lid to affect the draining process.

(e) to provide a food can drainer and lid removal tool which reduces spillage and requires less contact with ones hands.

(f) to provide a can drainer and lid removal tool which requires only a one handed operation to assist those who are physically unable to use the manual draining process which requires the use of both hands.

DRAWING FIGURES

Figure 1B:
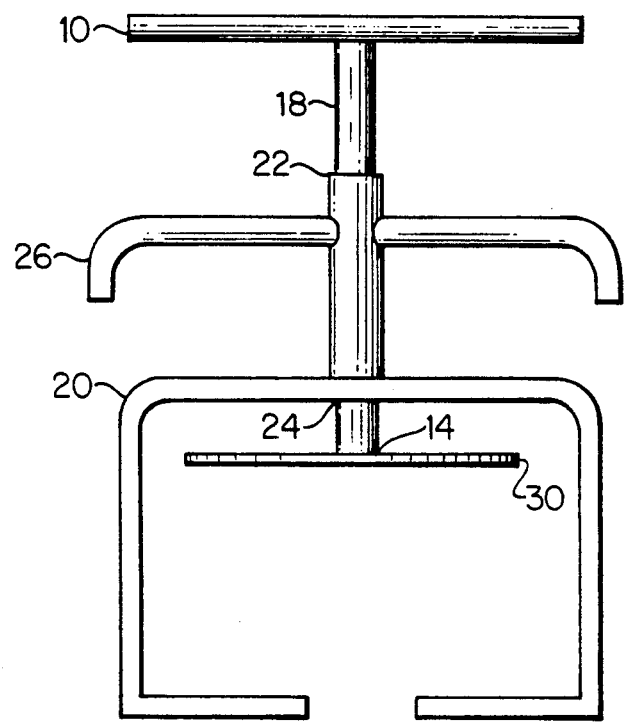
Figure 1C:
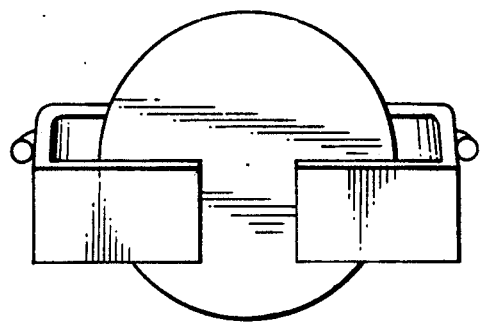
Figure 1D:
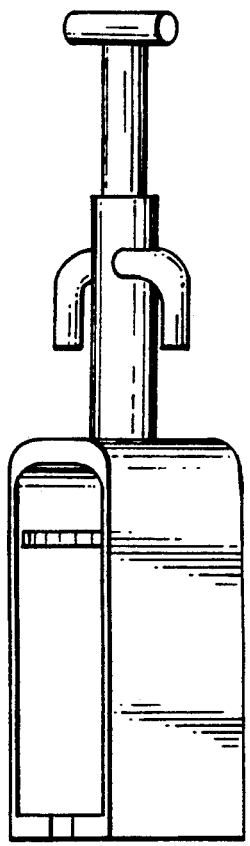
Figure 1E:
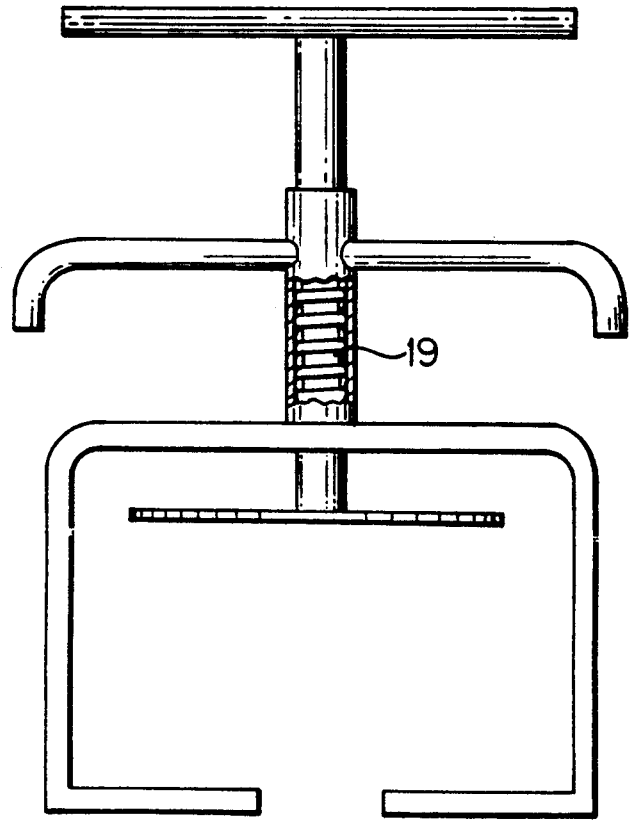

FIG. 1A shows the Can Drainer laying flat.
FIG. 1B shows the drainer from the front view.
FIG. 1C show the drainer from the bottom view.
FIG. 1D shows the drainer from the side view.
FIG. 1E shows the compression spring inside the shaft.

REFERENCE NUMBERS IN DRAWINGS

10: T shaped plunger handle, with spline
14: shaft thread
16: cross member
18: shaft
19: spring
20: base
22: hole
24: hole
26: base handle
30: 3 inch diameter magnetic plate with threaded female sleeve on top

DESCRIPTIONS—FIGS. 1A-1E

A typical embodiment of the unit of the present invention is illustrated in FIG. 1B (front view). The unit has a fixed base 20 (FIG. 1B) with a hole 22 (FIG. 1B) running through the base and a fixed handle 26 (FIG. 13). The base 20 (FIG. 1B) houses a compression spring 19 (FIG. 1E). A threaded T shaped handle 10 (FIG. 1B) with spline to engage the compresssion spring 19 (FIG. 1E), inserts through the base hole 22 (FIG. 1B). The threaded end of the handle 14 (FIG. 1B) is screwed into the threaded female sleeve attached to the 3 inch diameter magnetic plate 30 (FIG. 1B).

The plunger handle 10 (FIG. 1B) is T shaped at one end, with a spline approximately 1 13/16 inches from the bottom threaded end 14 (FIG. 1B). The horizontal T shaped cross member is a ¼ inch rounded handle and the longitudinal shaft 18 (FIG. 1B) is ⅜ inch rounded. The spline is 1/16 inch around the shaft 18 (FIG. 1B) and the spline engages the spring 19 (FIG. 1E) when the handle is depressed.

The base 20 (FIG. 1B) is 1 inch deep and approximately 2⅝ inches tall on the inside measurement and approximately 3 inches tall on the outside.

OPERATION—FIG. 1B AND FIG. 1E

The manner of using this invention to drain liquids or to remove opened can lids is to place the can requiring draining or lid removal on the bottom of the base 20. The lid has already been cut by an electrical or manual can opener and is still laying within the can. To drain the liquid one places ones fingers around the base handle 26, and ones palm over the T shaped plunger handle 10. Pressure is applied by squeezing the T shaped plunder handle 10, toward the base handle 26.

This action will force the magnetic plate 30 against the can lid, and cause the magnetic plate 30 to magnetically affix itself to the can lid. To cause the liquid to drain, one tilts the invention while applying sufficient pressure to expel the liquid.

Upon completion of the draining process, or upon removal of the lid, the compression spring 19 will cause the T shaped handle 10 to return to its original place, with the can lid attached to the magnetic plate 30. One now removes the lid from the magnetic plate 30. One can now disassemble the unit for cleaning purposes.

SUMMARY, RAMIFICATIONS, AND SCOPE

Accordingly, the reader will see that the utility of this invention can be used to safely drain liquid or remove a lid from a can of opened food, will reduce the time currently required in the food preparation process, will reduce injuries by providing a tool which eliminates the need for individuals to improperly use a sharp can lid as part of the draining process, will reduce injuries resulting from extracting the can's lid which may also become wedged inside can after manually draining, will improve the sanitary conditions by eliminating the time food is exposed to the air for draining or handled unnecessarily and improperly, will reduce the risk of ruining clothing due to squirting liquids or soiled fingers, and will allow one handed operation so that those with an impairment to one hand can drain unwanted liquids.

This invention can be custom-made for institutional sized, non-standard, standard, or irregular cans.

Although the description above contains many specificities, these should not be construed as limiting the scope of the invention but as merely providing illustrations of some of the presently preferred embodiments of this invention.

Thus the scope of the invention should be determined by the appended claims and their legal equivalents rather than by the examples given.

We claim:

1. A can draining device for draining liquid from an opened can with a detached lid within the can comprising:
    (a) a base with first and second ends;
    (b) a first upright with first and second ends connected to the first end of the base at the first end of the first upright;
    (c) a second upright with first and second ends connected to the second end of the base at the first end of the second upright;
    (d) a crosspiece connected to the first and second uprights at the second end of the first and second uprights and a hole extending through the crosspiece;
    (e) a tubular member extending from the crosspiece in a direction opposite the base;
    (f) a first handle means connected to the hollow tubular member;
    (g) a shaft having first and second ends and extending through the hollow tubular member and the hole in the crosspiece;
    (h) a second handle means connected to the shaft at the first end of the shaft; and
    (i) a magnetic plate attached to the shaft at the second end of the shaft, whereby an opened can with a detached lid within the can positioned between the magnetic plate and the base may be drained of liquid and the detached lid within the can magnetically held and removed from within the can by the magnetic plate.

2. The device of claim 1, wherein a spring is housed within the hollow tubular member and is connected to the shaft and is adapted to bias the magnetic plate in a direction away from the base.

* * * * *